United States Patent [19]
Rist

[11] 3,799,306
[45] Mar. 26, 1974

[54] FREE-WHEEL MECHANISMS AND FREE WHEELS INCORPORATING SUCH MECHANISMS

[75] Inventor: Michel Theophile Rist, Boulogne, France

[73] Assignee: Societe Anonyme Francaise Du Ferodo, Paris, France

[22] Filed: July 26, 1972

[21] Appl. No.: 275,273

[30] Foreign Application Priority Data
July 27, 1971  France .............................. 71.27411

[52] U.S. Cl. ............................................... 192/45
[51] Int. Cl. ............................................ F16d 15/00
[58] Field of Search ...................... 192/45; 188/82.84

[56] References Cited
UNITED STATES PATENTS
| | | | |
|---|---|---|---|
| 2,204,768 | 6/1940 | Peck ..................................... | 192/45 |
| 2,705,552 | 4/1955 | Cross et al. .......................... | 192/45 |
| 3,380,563 | 4/1968 | Bowers et al. ...................... | 192/45 X |

*Primary Examiner*—Allan D. Herrmann
*Attorney, Agent, or Firm*—Young and Thompson

[57] ABSTRACT

The present invention is concerned with improvements in free-wheel mechanisms adapted to couple together or to disconnect two members capable of relative rotation. The free-wheel mechanism is intended to cooperate with two circular tracks, an inner track and an outer track, one of said tracks comprising ramp means, a plurality of jamming members such as rollers, an assembly cage for said jamming members, said cage having a circular series of windows adapted to receive said jamming members, elastic means such as a ring for urging said members directly or indirectly into the jamming position, abutment means carried by said cage and provided so as to limit the radial movement of said jamming members, said mechanism further comprising, at least on one side, an abutment side-plate immobilized in rotation with respect to said track with ramps by means of a part of said elastic ring adapted to co-operate with a groove formed in said abutment side-plate.

These free-wheel mechanisms find numerous advantageous applications in transmission systems for vehicles, for example, in hydraulic torque converters.

5 Claims, 4 Drawing Figures

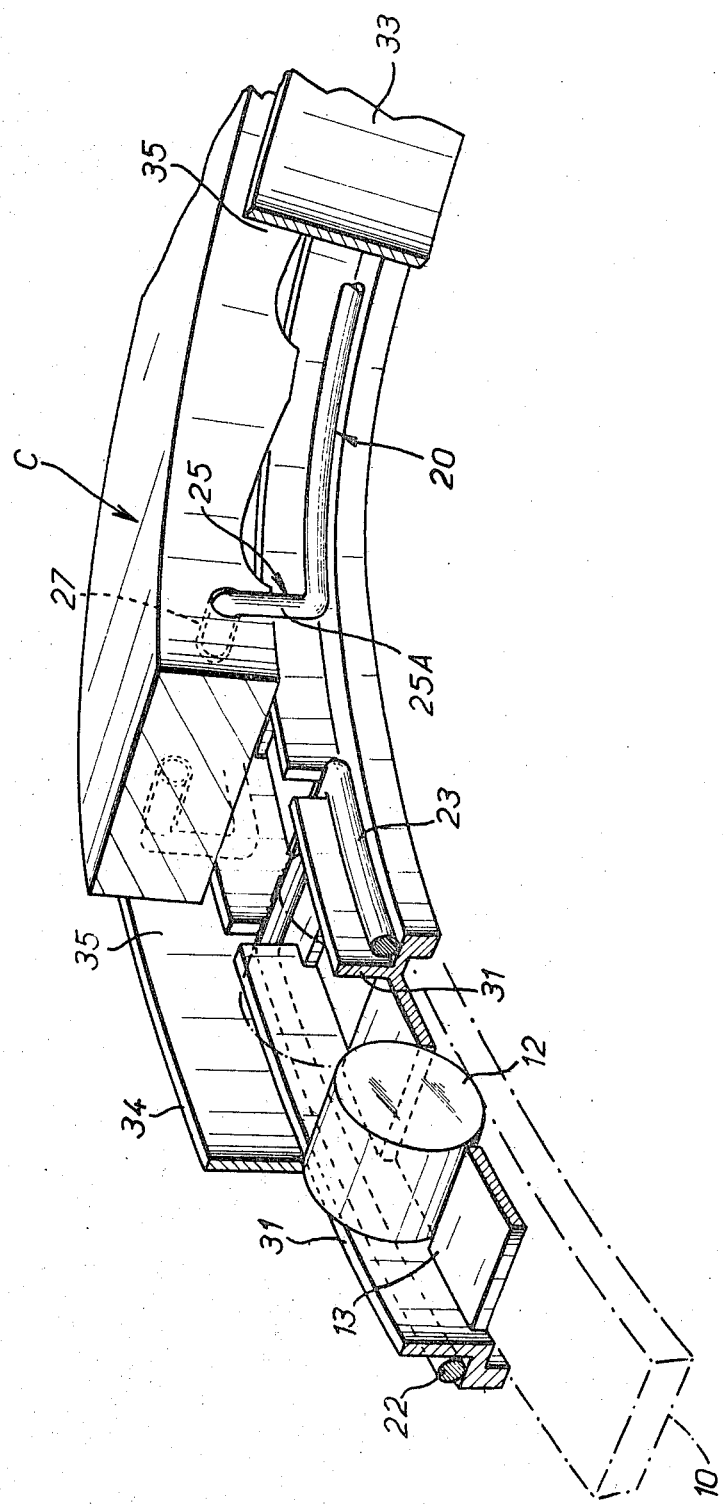

FREE-WHEEL MECHANISMS AND FREE WHEELS INCORPORATING SUCH MECHANISMS

The present invention relates to a free-wheel mechanism adapted to couple together or to disconnect from each other two members which are capable of rotation with respect to each other as a function of the relative direction of rotation.

Generally speaking, the mechanisms at present known do not comply with two essential conditions, which are: easy and rapid assembly, and a low production cost with reliable operation.

In fact, free-wheel mechanisms are known in which the assembly of the various constituent elements is easy, and can thus be carried out rapidly. Unfortunately, mechanisms of this type have a very high production cost, due in particular to complicated tooling and machining of the various parts.

Conversely, free-wheel mechanisms are known in which the production cost is low due to the simplicity of construction of the various parts, but in which the assembly presents considerable difficulties which offset the above-mentioned advantages.

The present invention has for its object to find a remedy for these disadvantages and to provide a free-wheel mechanism having good resistance to wear, a high capacity for torque transmission with a small overall size, while at the same time the mechanism is of simple design and easy construction, and has therefore a low production cost.

According to the invention, a free-wheel mechanism comprises a pair of inner and outer circular tracks, one of said tracks having ramps means, a plurality of jamming members, a circular cage having a plurality of spaced windows for receiving the jamming members and limiting their movement radially, resilient ring means for urging said members into jamming position, a lateral abutment plate at one side of said mechanism, a portion of said resilient ring means connecting said lateral abutment plate with said one track having ramp means, a groove provided in said lateral abutment plate cooperating with said portion of the resilient ring means. In a preferred embodiment, the resilient ring means has two free ends, one of these free ends cooperating with said one track with ramps and the other end cooperating with the cage. It is also preferred that the resilient means be a thread-like member comprising a pair of parallel spaced apart open rings joined together by a bridge member, there being open loops at the free ends of the ring means for hooking onto the one track with ramp means and the cage respectively. It is also preferred that the grooves in the lateral abutment plate and the cage be substantially radially oriented.

The invention has also for its object a free-wheel equipped with a mechanism such as that described in the foregoing text.

Other characteristic features and advantages of the invention will furthermore be brought out in the description followed below, given solely by way of example, reference being made to the accompanying drawings, in which:

FIG. 4 is an enlarged fragmentary perspective view of the assembly cage of a free wheel mechanism according to the invention.

Figure 3:
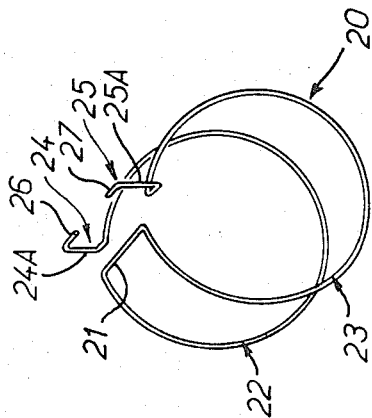
FIG. 3 is a perspective view of the elastic means shown in FIG. 1.
Figure 2:
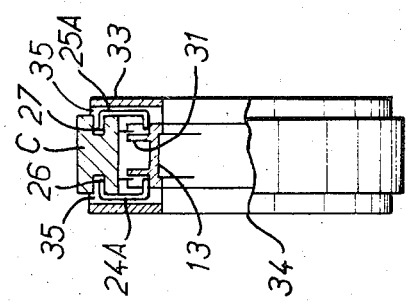
FIG. 2 is a view in cross-section of a free wheel taken along the line II—II of FIG. 1.
Figure 1:
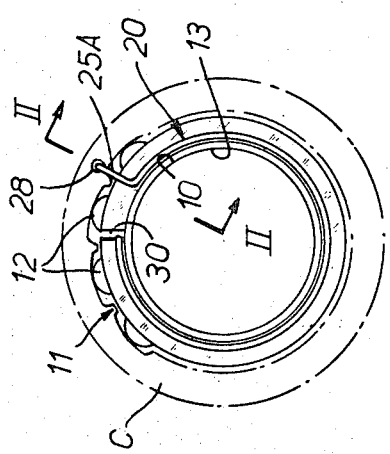
FIG. 1 shows a partial view in perspective of the assembly cage of a free-wheel mechanism according to the invention.

In the form of construction chosen and shown in FIGS. 1 to 4, the free-wheel mechanism according to the invention comprises an inner track 10, an outer track 11 and, between the two tracks, jamming members in the form of rollers 12. The rollers are engaged in an assembly cage 13 and are intended to co-operate with the outer track 11.

In this form of construction, the elastic means provided to initiate the wedging action of the jamming members 12 are constituted by a thread-like element 20. This element 20 which is particularly shown in FIG. 3 in its position of rest, in the free state, is shaped in such manner as to form, on each side of a bridge member 21, two rings 22, 23 of circular shape, which are intended each to be located in the vicinity of a lateral face of the rollers 12.

Each end portion of the above-mentioned rings comprises an open loop 24, 25 in an axial direction, in which the free extremity 26, 27 is intended to be engaged in a housing 28 in the outer ring C, while the bridge member 21 is engaged between two rollers 12 in substantially radial slots 30 formed in cheeks 31 provided on the inner portion of the assembly cage 13. Abutment plates 33, 34 are then applied to each side of the device. In order to prevent their rotation, these side-plates are provided on their inner faces with grooves 35 which receive the radial portions 24A, 25A of the loops 24, 25. The portions 24A, 25A thus connect plates 33, 34 with track 11.

By the effect of the thread-like member 20 applying its action on the inner assembly cage, the rollers 12 are brought, at the beginning of the jamming action, into contact with the two inner and outer tracks having the respective references 10 and 11.

In the foregoing description, it has been assumed that the inner track has a smooth cylindrical surface, while the outer track was provided with ramp means intended to act in combination with the inner track and spring means, so as to ensure the jamming of the wedging members such as rollers, but it will be readily understood that the ramp means could be provided on the cylindrical surface which constitutes the inner track, while the outer track had a smooth inner surface.

Free wheels comprising a mechanism according to the invention can find numerous applications. They may be advantageously employed for industrial purposes, for vehicles, and in particular as a constituent part of a transmission system, for example in a hydraulic torque converter, etc.

It will of course be understood that the invention is not limited to the forms of construction selected and shown, which have been given solely by way of examples but is on the contrary capable of being given alternative forms without thereby departing from the scope of the invention.

What I claim is:

1. A free wheel mechanism comprising a pair of inner and outer circular tracks, one of said tracks having ramps means, a plurality of jamming members, a circular cage having a plurality of spaced windows for receiving the jamming members, resilient ring means for urging said members into jamming position, a lateral abutment plate at one side of said mechanism, a portion of said resilient ring means connecting said lateral abutment plate with said one track having ramp means, a groove provided in said lateral abutment plate cooperating with said portion of the resilient ring means.

2. A free wheel mechanism as claimed in claim 1, wherein said resilient ring means has two free ends, one of said free ends cooperating with said one track with ramps and the other end cooperating with said cage.

3. A free wheel mechanism as claimed in claim 1, wherein said grooves in said lateral abutment plate and said cage are substantially radially oriented.

4. A free wheel mechanism as claimed in claim 1, wherein said resilient ring means is a thread-like member comprising a pair of parallel spaced apart, open rings joined together by a bridge member, and open loops being provided at said free ends of said ring means for hooking onto said one track with ramp means and said cage respectively.

5. A free wheel mechanism as claimed in claim 4, wherein the bridge member is engaged in a groove formed in the cage for locating the bridge member between two consecutive jamming members.

* * * * *